US012449868B2

(12) United States Patent
Butta' et al.

(10) Patent No.: US 12,449,868 B2
(45) Date of Patent: Oct. 21, 2025

(54) RESET CIRCUIT

(71) Applicant: STMicroelectronics International N.V., Geneva (CH)

(72) Inventors: Pasquale Butta', Messina (IT); Alessandro Inglese, San Pietro Clarenza (IT); Antonino Mondello, Messina (IT); Michele Alessandro Carrano, Catania (IT); Riccardo Condorelli, Catania (IT)

(73) Assignee: STMicroelectronics International N.V., Geneva (CH)

( * ) Notice: Subject to any disclaimer, the term of this patent is extended or adjusted under 35 U.S.C. 154(b) by 36 days.

(21) Appl. No.: 18/422,179

(22) Filed: Jan. 25, 2024

(65) Prior Publication Data

US 2024/0256018 A1    Aug. 1, 2024

(30) Foreign Application Priority Data

Jan. 27, 2023 (FR) ...................... 2300767

(51) Int. Cl.
  *H03K 17/22* (2006.01)
  *G06F 1/24* (2006.01)

(52) U.S. Cl.
  CPC ............ *G06F 1/24* (2013.01); *H03K 17/22* (2013.01)

(58) Field of Classification Search
  None
  See application file for complete search history.

(56) References Cited

U.S. PATENT DOCUMENTS

| | | | |
|---|---|---|---|
| 8,122,334 B2 * | 2/2012 | Lee | H04L 1/0061 |
| | | | 714/48 |
| 10,445,500 B2 | 10/2019 | Schon et al. | |
| 2018/0091149 A1 | 3/2018 | Kuenemund et al. | |
| 2020/0143090 A1 | 5/2020 | Patki | |
| 2021/0192089 A1 | 6/2021 | Weiner et al. | |
| 2024/0242749 A1 * | 7/2024 | Condorelli | G06F 1/24 |

OTHER PUBLICATIONS

INPI Search Report and Written Opinion for priority application, FR Appl. 2300767, report dated Aug. 22, 2023, 9 pgs.

\* cited by examiner

*Primary Examiner* — Jeffrey S Zweizig
(74) *Attorney, Agent, or Firm* — Crowe & Dunlevy LLC

(57) ABSTRACT

An electronic device includes at least two electronic components. A reset circuit includes: a parity control circuit; at least two first flip-flops, wherein each first flip-flop has an output coupled to at least one of the at least two electronic components; and at least two second flip-flops, wherein each second flip-flop has at least one output coupled to an input of the parity control circuit.

22 Claims, 4 Drawing Sheets

RESET CIRCUIT

PRIORITY CLAIM

This application claims the priority benefit of French Application for Patent No. 2300767, filed on Jan. 27, 2023, the content of which is hereby incorporated by reference in its entirety to the maximum extent allowable by law.

TECHNICAL FIELD

The present disclosure generally concerns electronic systems and devices and, in particular, the security of electronic systems and devices. The present disclosure more precisely relates to the protection of electronic systems and devices against attacks by resetting of all or part of an electronic system or device.

BACKGROUND

Many complex or semi-complex electronic systems and/or devices comprise one or a plurality of circuits configured for implementing a resetting of the system or device. A resetting of a device corresponds to the total stopping of all or part of the electronic components comprised in the system or device. Moreover, a reset interrupts all the current operations, clears all the saved errors and all the current events, and allows to put the system or device back to a known initial state.

It would be desirable to be able to improve, at least partly, certain aspects of reset circuits used in electronic devices.

There is a need for higher-performance circuits for resetting electronic systems or devices.

There is a need for circuits for resetting electronic systems or devices configured to detect a partial reset attack.

There is a need in the art to overcomes all or part of the disadvantages of known circuits for resetting electronic systems or devices.

SUMMARY

An embodiment provides a reset circuit configured to detect a partial reset attack.

An embodiment provides a reset circuit comprising a circuit configured to detect anomalies.

One embodiment provides a circuit for resetting an electronic device comprising at least two electronic components, said reset circuit comprising: a parity control circuit; at least two first flip-flops, each first flip-flop comprising an output coupled to at least one of said at least two electronic components; at least two second flip-flops, each second flip-flop comprising at least one output coupled to an input of said parity control circuit.

According to an embodiment, the circuit further comprises a control circuit configured to deliver a reset control signal, said at least two first and second flip-flops being controlled by said reset signal.

According to an embodiment, said at least two first and second flip-flops each comprise at least one reset input receiving the reset control signal.

According to an embodiment, said at least two second flip-flops each comprise at least one input configured to receive a power supply voltage.

According to an embodiment, each of said at least two second flip-flops is placed at a distance shorter than a critical distance from at least said one of the two first flip-flops.

According to an embodiment, said critical distance is the minimum length of a metal track for which a pulse is recognizable as being a control pulse by said at least two first flip-flops.

According to an embodiment, said pulse is recognizable as being a control pulse when its time duration is longer than a minimum duration and/or when the value of its amplitude is greater than a minimum value.

According to an embodiment, at least one of said two second flip-flops is associated with a plurality of said at least two first flip-flops.

According to an embodiment, said at least two first and second flip-flops are D-type flip-flops.

Another embodiment provides an electronic device comprising a reset circuit previously described.

Another embodiment provides a method of detecting a partial reset attack using a reset circuit previously described.

According to an embodiment, said at least two second flip-flops have different states, then said parity control circuit signals an anomaly.

According to an embodiment, when said parity control circuit signals an anomaly, said control circuit requests a resetting of said device.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

The embodiments described hereafter concern the protection of electronic systems and devices against partial reset attacks. In the following description, reference to a partial reset attack means an attack during which an external user, for example, an ill-intentioned user, forces a component or a portion of an electronic system or device to reset. A user may take advantage of the specific architecture of a circuit for resetting an electronic system or device to induce a local reset order, for example by using a magnetic coupling phenomenon. Such an architecture is described in relation with FIG. 1.

The embodiments more particularly relate to a reset circuit configured to detect a partial reset attack.

Figure 1:
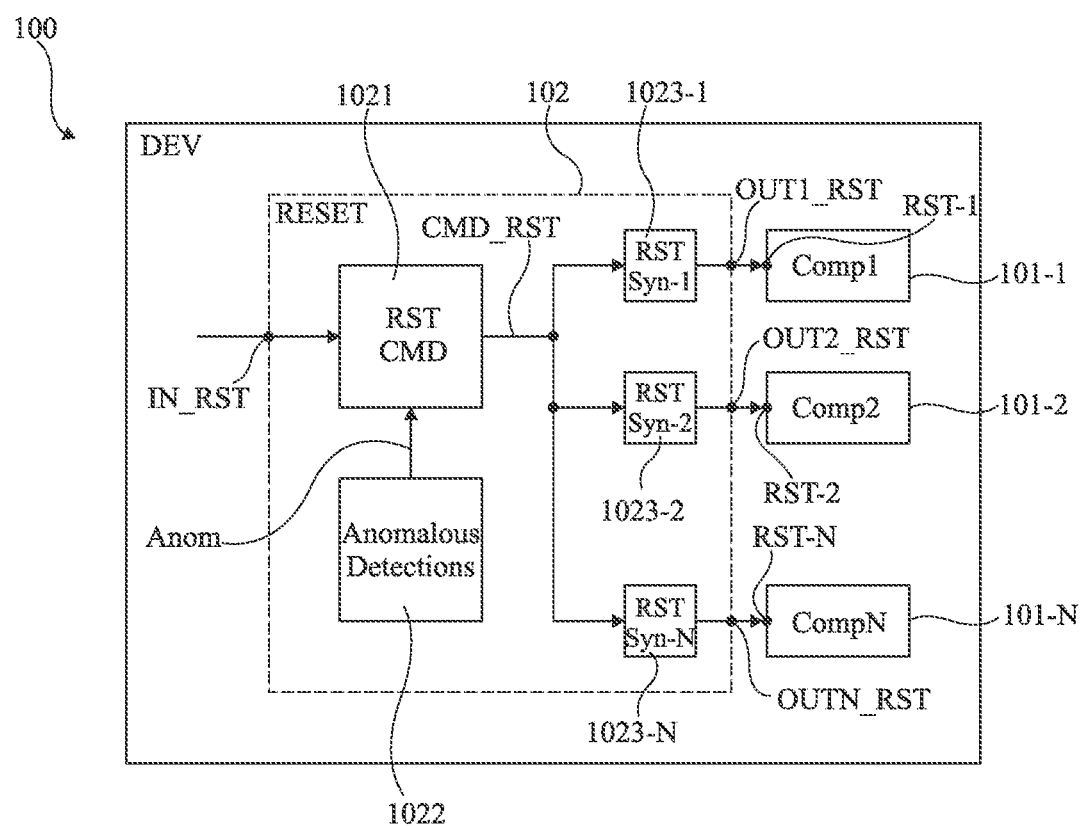
FIG. 1 very schematically shows in the form of blocks an embodiment of an electronic device.

FIG. 1 very schematically shows in the form of blocks an embodiment of an electronic device 100.

Electronic device 100 is a complex or semi-complex electronic device comprising at least two electronic components, generally more than two electronic components. More particularly, in FIG. 1, device 100 comprises N electronic components 101-1, 101-2, . . . , 101-N, N being an integer greater than or equal to two.

Each electronic component 101-1, 101-2, . . . , 101-N may be a unit electronic component, an assembly of unit electronic components, a simple electronic circuit, an assembly of simple electronic circuits, a unit electronic module, or an assembly of unit electronic modules.

Moreover, each electronic component 101-1, 101-2, . . . , 101-N comprises a reset terminal RST-1, . . . , RST-N configured to receive a reset command. In practical and according to an example, each electronical component can comprise a flip-flop of which reset terminal is the reset terminal RST-1, . . . , RST, N of the component 101-1, . . . , 101-N.

Device 100 further comprises a reset circuit 102 (RESET) according to an embodiment. The reset circuit has the role of managing an operation of resetting of device 100. During such an operation, all the components 101-1, 101-2, . . . , 101-N of device 100 are reset. To achieve this, reset circuit 102 comprises at least one input IN_RST, and as many outputs OUT1_RST, OUT2_RST, . . . , OUTN_RST as electronic components 101-1, 101-2, . . . , 101-N comprised in electronic device 100, that is, N outputs OUT1_RST, OUT2_RST, . . . , OUTN_RST in FIG. 1. An embodiment of a reset circuit 102 is described in relation with FIGS. 2 to 4.

Input IN_RST is configured to receive a reset request that may originate from different sources. According to a first example, a request source may for example, be a power supply monitoring signal, an order given by a user of device 100, an internal control signal of device 100, etc. According to an example, circuit 102 may comprise a plurality of inputs of the type of input IN_RST, each input being configured, for example, to receive a reset request from a specific source.

Each output OUT1_RST, OUT2_RST, . . . , OUTN_RST is configured to deliver a reset control signal to a component 101-1, 101-2, . . . , 101-N. According to an example, in FIG. 1, output OUTi_RST is configured to deliver a reset control signal to component 101-i, i being an integer varying between 1 and N.

Figure 2:
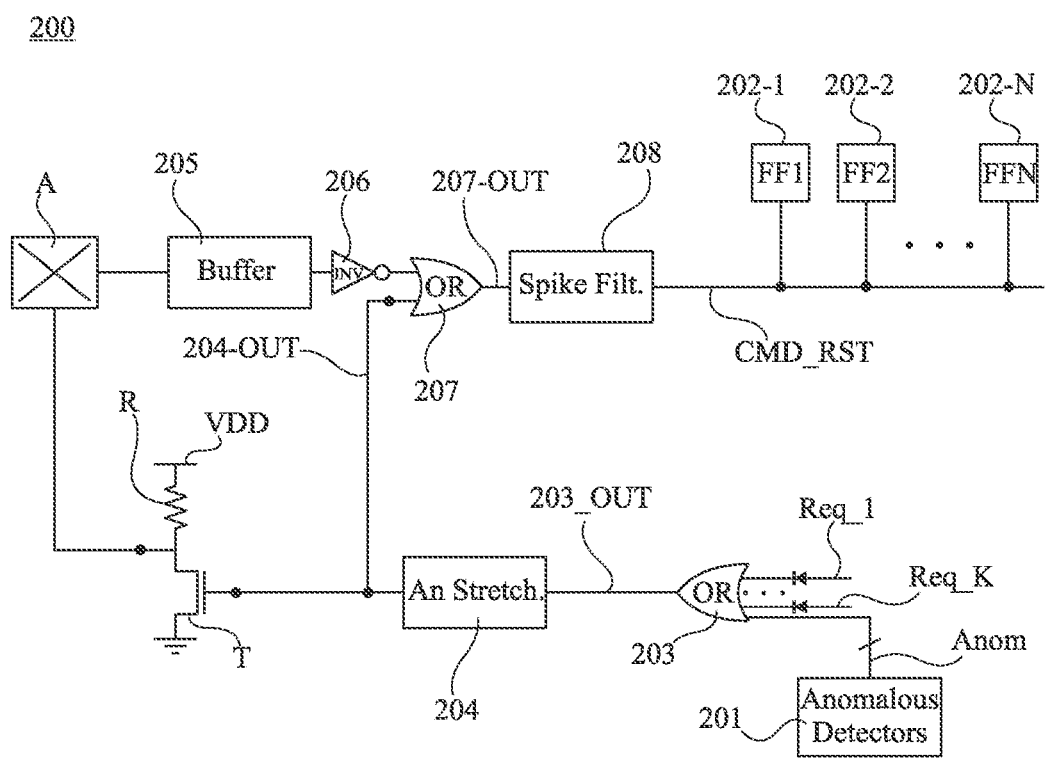
FIG. 2 schematically and partially shows in the form of blocks an embodiment of a reset circuit.

More particularly, reset circuit 102 comprises: a control circuit 1021 (RST CMD); an anomaly detection circuit 1022 (Anomalous Detectors); and synchronization circuits 1023-1 (RST Syn-1), 1023-2 (RST Syn-2), . . . , 1023-N (RST Syn-N), for example as many synchronization circuits 1023-1, 1023-2, . . . , 1023-N as electronic components comprised in electronic device 100, that is, N flip-flops 1023-1, 1023-2, . . . , 1023-N in FIG. 2.

Control circuit 1021 (RST CMD) comprises at least a first input coupled, preferably connected, to the input IN_RST of reset circuit 102, and a second input receiving an anomaly detection signal Anom. According to an example, reset signal 102 comprises a plurality of inputs of the type of input IN_RST, control circuit 1021 comprises a plurality of inputs, each coupled, preferably connected, to an input of the type of input IN_RST. Control circuit 102 further comprises an output configured to deliver a reset control signal CMD_RST. According to an example, reset control signal CMD_RST is a control pulse, that is, a signal having a rising edge and then a falling edge for a given duration. The reset command CMD_RST is designated to be send to the reset terminal RST-1 to RST-N of components 101-1 to 101-N.

Anomaly detection circuit 1022 (Anomalous Detect) is configured to detect a reset control signal received by an electronic component different from reset control signal CMD_RST. According to an embodiment, anomaly detection circuit 1022 is particularly configured to detect a false reset control signal, also called anomaly, received by only one or part of components of 101-1, 101-2, . . . , 101-N. According to an example, when reset control signal CMD_RST is a control pulse, a false reset control signal may be a control pulse of shorter duration. Anomaly detection circuit 1022 is configured to deliver anomaly detection signal Anom to control circuit 1021. Anomaly detection circuit is described in further detail in relation with FIGS. 3 and 4.

Synchronization circuits 1023-1, . . . , 1023-N are optional. They are aimed to synchronize the reset command in order that each component receives the reset command at the same time. Indeed, components 101-1, . . . , 101-N may operate by using different clock signals and/or different power supply modes. If two or more components 101-1, . . . , 101-N operate by using the same clock signal and the same power supply mode, they can share a synchronization circuit 1023-1, . . . , 1023-N. Each synchronization circuit 1023-1, 1023-2, . . . , 1023-N is configured to receive reset control signal CMD_RST and to transmit it to an output OUT1_RST, OUT2_RST, . . . , OUTN_RST. According to an example, in FIG. 1, circuit 1023-i is configured to deliver the reset control signal to output OUTi_RST, and thus to delivering the reset control signal to component 101-i, i varying from 1 to N.

During a partial reset attack, an ill-intentioned user may for example, inject a false reset control signal at the level of one of reset terminals RST-1 to RST-N of electronical components 101-1 to 101-N. Anomaly detection circuit 1022 is configured to detect such a false control signal.

FIG. 2 schematically shows, but in further detail, a reset circuit 200 of the type of the reset circuit 100 described in relation with FIG. 1. FIG. 2 more particularly illustrates in further detail a control circuit of the type of the control circuit 1021 described in relation with FIG. 1.

As described in relation with FIG. 1, reset circuit 200 comprises an anomaly detection circuit 201 of the type of the anomaly detection circuit 1022 described in relation with FIG. 1, and flip-flops 202-1, 202-2, . . . , 202-N of the type of the flip-flops forming the reset terminal of components 101-1 to 101-N described in relation with FIG. 1. Anomaly detection circuit 1022 delivers an anomaly detection signal Anom. Flip-flops 202-1, 202-2, . . . , 202-N are coupled, preferably connected, to outputs of reset circuit 200 not shown in FIG. 2.

The other components and circuits described hereafter form part of the control circuit of reset circuit 200.

The control circuit comprises an OR-type logic gate 203 (OR) configured to receive, at its input, signal Anom and reset requests Req1, . . . , ReqK originating from internal sources of the device comprising circuit 200. According to an example, in FIG. 2, the control circuit is configured to receive K reset requests from internal sources, K being an integer greater than or equal to one. Reference made here to a reset request having an internal source refers to a reset request originating from a component of the device comprising circuit 200. Logic gate 203 outputs a signal 203_OUT corresponding to a first version of the reset control signal delivered at the output of the control circuit. According to an example, signal 203_OUT exhibits a control pulse when one of the signals received at the input of gate 203 exhibits a control pulse.

The control circuit further and optionally comprises a duration adjustment circuit 204 (An Stretch) configured to receive, as an input, signal 203_OUT, and to deliver, as an output, a signal 204_OUT corresponding to a second version of the reset control signal delivered at the output of the control circuit. Duration adjustment circuit 204 enables to perform a time extension and/or compression of the signal 203_OUT that it receives as an input. According to an example, circuit 204 enables to lengthen the duration of a control pulse transferred by signal 203_OUT.

The control circuit further comprises a transistor T and a resistor R. Transistor T and resistor R are arranged in series between a node of application of a power supply voltage VDD and a node receiving a reference voltage, for example, the ground. More particularly, a first terminal of resistor R is coupled, preferably connected, to the node receiving power supply voltage VDD and a second terminal of resistor R is coupled, preferably connected, to a first conduction terminal of transistor T. A second conduction terminal of transistor T is coupled, preferably connected, to the node receiving the reference voltage. The control terminal of transistor T receives signal 204_OUT. According to an example, transistor T is an N-channel metal-oxide gate field-effect transistor, or NMOS transistor.

The midpoint between transistor T and resistor R is coupled to a node A. According to an example, node A is accessible to a user and allows to apply an external reset command.

The control circuit further comprises a buffer circuit 205 and an inverter circuit 206. An input of the buffer circuit is coupled, preferably connected, to node A and an output of buffer circuit 205 is coupled, preferably connected, to the input of inverter circuit 206.

The control circuit further comprises an OR-type gate 207 (OR) comprising two inputs. A first input is coupled, preferably connected, to the output of duration adjustment circuit 204, and thus receives signal 204_OUT. A second input is coupled, preferably connected, to the output of inverter circuit 206. Gate 207 further comprises an output delivering a signal 207_OUT corresponding to a reset control.

The control circuit further optionally comprises a filtering circuit 208 (Spike Filt) configured to receive as an input signal 207_OUT and to delivering as an output a signal corresponding to the filtered reset control signal RST_CMD. According to an example, filtering circuit 208 has the role of filtering voltage spikes having too short a duration present on the signal corresponding to reset control signal CMD_RST.

Reset control signal CMD_RST is then delivered to all flip-flops 202-1, 202-2, . . . , 202-N.

Figure 3:
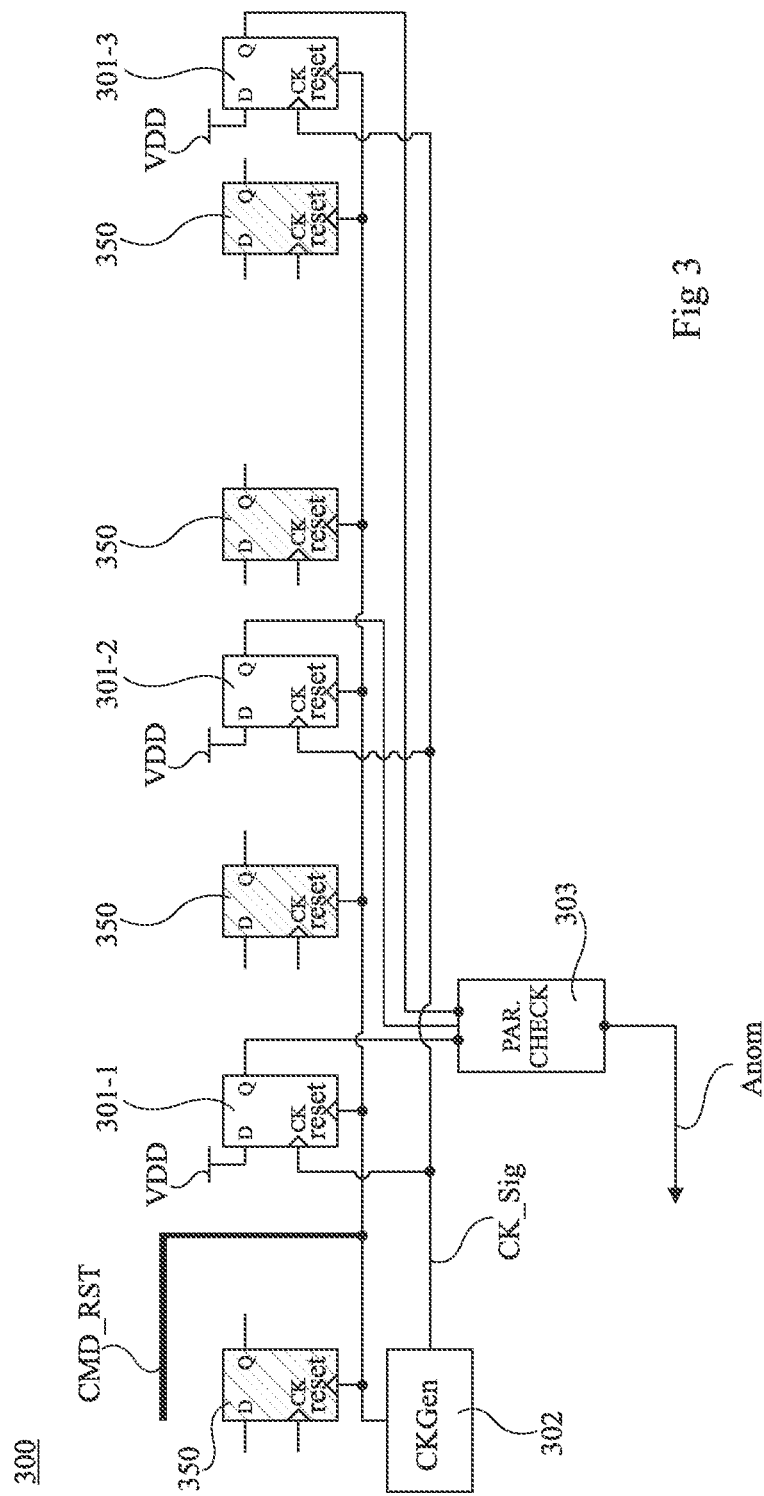
FIG. 3 schematically and partially shows in the form of blocks a portion of the embodiment of FIG. 2.

FIG. 3 schematically shows in further detail a portion of a reset circuit of the type of the reset circuits 100 and 200 described in relation with FIGS. 1 and 2. FIG. 3 more particularly illustrates in further detail an anomaly detection circuit 300 of the type of the anomaly detection circuits 1022 and 201 described in relation with FIGS. 1 and 2. FIG. 3 further illustrates flip-flops 350 of the reset circuit of the type of the flip-flops forming the reset terminal of components 101-1 to 101-N and of the flip-flops 202-1, 202-2, . . . , 202-N described in relation with FIGS. 1 and 2.

Anomaly detection circuit 300 comprises flip-flops of the same type as the flip-flops 350 of the reset circuit comprising circuit 300. In the example shown in FIG. 3, anomaly detection circuit 300 comprises three flip-flops 301-1, 301-2, and 301-3. More generally however, anomaly detection circuit 300 comprises M flip-flops, M being an integer greater than or equal to zero. According to an embodiment, M is smaller than or equal to the number of flip-flops 350 comprised in the reset circuit comprising circuit 300. According to a preferred embodiment, M is equal to the number of flip-flops 350. Further, in the example of FIG. 3, flip-flops 350 are four and are hatched.

According to an embodiment, flip-flops 301-1 to 301-3 are arranged in the device comprising the reset circuit so as to be physically close to flip-flops 350. Conversely to flip-flops 350, flip-flops 301-1 to 301-3 are not associated with a component of the electronic device, but with one or a plurality of flip-flops 350. The role of a flip-flop 301-1 to 301-3 is to be sufficiently close to a flip-flop 350 to receive a false reset control signal, or anomaly, at the same time as a flip-flop 350. In particular, a false reset control signal may be sent to a flip-flop 350 by using a phenomenon of magnetic coupling at the level of the metal track delivering the reset control signal to flip-flop 350, a flip-flop 301-1 to 301-3 arranged sufficiently close to flip-flop 350 may thus be capable of receiving this same false reset control signal.

According to an embodiment, each flip-flop 301-1 to 301-3 is arranged at a distance L, or length L, from one or a plurality of flip-flops 350, this distance being shorter than a critical distance Lcrit, or critical length Lcrit, so that a flip-flop 301-1 to 301-3 is considered as sufficiently close to a flip-flop 350. The critical distance Lcrit is defined as being the minimum distance of a metal track for which a control pulse of the reset control signal is recognizable as being a control pulse by the flip-flop. There is here called control pulse a signal having a rising edge and then a falling edge for a given duration, and having a sufficiently long duration to trigger the resetting of the flip-flop. It is also said that a control pulse is not recognizable by a flip-flop if its time duration is too short and/or if the value of its amplitude is not sufficiently high to be detected. In other words, a pulse is recognizable as being a control pulse if its time duration is greater than a minimum duration Tmin, and/or if the value of its amplitude is greater than a minimum value Vmin. According to an example, minimum duration Tmin is in the range from 1 to 300 ps. According to an example, a control pulse may not be recognizable as a result of a degradation of the metal track transmitting it.

According to an example, flip-flops 301-1 to 301-3 and flip-flops 350 are D-type flip-flops, that is, flip-flops comprising: a data reception terminal D; an output terminal Q; an inverted output terminal NQ, not shown in FIG. 3; a clock terminal CK; and a reset terminal RESET.

The reset terminals RESET of flip-flops 301-1 to 301-3 and of flip-flops 350 are all configured to receive a signal corresponding to the previously-defined reset control signal CMD_RST.

The D terminal of each flip-flop 301-1 to 301-3 is configured to receive a power supply voltage VDD having the value of its amplitude corresponding to a high value for the D terminal. In other words, the data received on the D terminal is a logic "1".

The D, Q, and CK terminals of flip-flops 350 are, according to an example, coupled to the components of the device with which flip-flops 350 are associated, as described in relation with FIG. 1.

Anomaly detection circuit 300 further comprises a clock 302 (CK Gen) configured to deliver a signal CK_Sig across the terminals CK of flip-flops 301-1 to 301-3 of anomaly detection circuit 300. More particularly, a rising edge of signal CK_Sig is generated at each falling edge of the reset signal CMD_RST. Signal CK_Sig is aimed to prepare flip flop 301-1 to 301-N to a further reset.

Anomaly detection circuit 300 further comprises a parity control circuit 303 (PAR. CHECK) configured to receive as an input the outputs of all the flip-flops 301-1 to 301-3 of anomaly detection circuit 300 and to delivering as an output an anomaly detection signal Anom. Circuit 303 has the role of verifying that all the outputs of flip-flops 301-1 to 301-3 are equal. According to a preferred embodiment, a parity control circuit 303 is an architecture composed of XOR-type logic gates, said architecture comprising M inputs, each input being coupled, preferably connected, to a Q output of one of the M flip-flops 301-1 to 301-3.

The operation of anomaly detection circuit 300 is the following:

When the control circuit of the reset circuit asks for a resetting of the device, a reset control signal CMD_RST is sent to the terminals RESET of flip-flops 350. All the flip-flops 301-1 to 301-3 also receive this control signal and their outputs remain in a same state. The parity control circuit detects no difference, and signal Anom signals no anomaly. The reset method can thus continue seamlessly.

When a partial reset attack is executed, a false reset control signal is sent to the terminal RESET of one or a plurality of flip-flops 350. The flip-flop(s) 301-1 to 301-3 physically closest to the flip-flop 350 receiving the false information also receive this false control signal and see their output modified. The parity control signal detects that one or a plurality of outputs of flip-flops 301-1 to 301-3 are different from the other outputs, and signal Anom indicates that it detects an anomaly. In other words, the parity control circuit detects that flip-flops 301-1 to 301-3 have different states, that is, at least one of flip-flops 301-1 to 301-3 has a state different from the others. According to an example, the control circuit of the reset circuit may ask for a resetting of the device.

Figure 4:
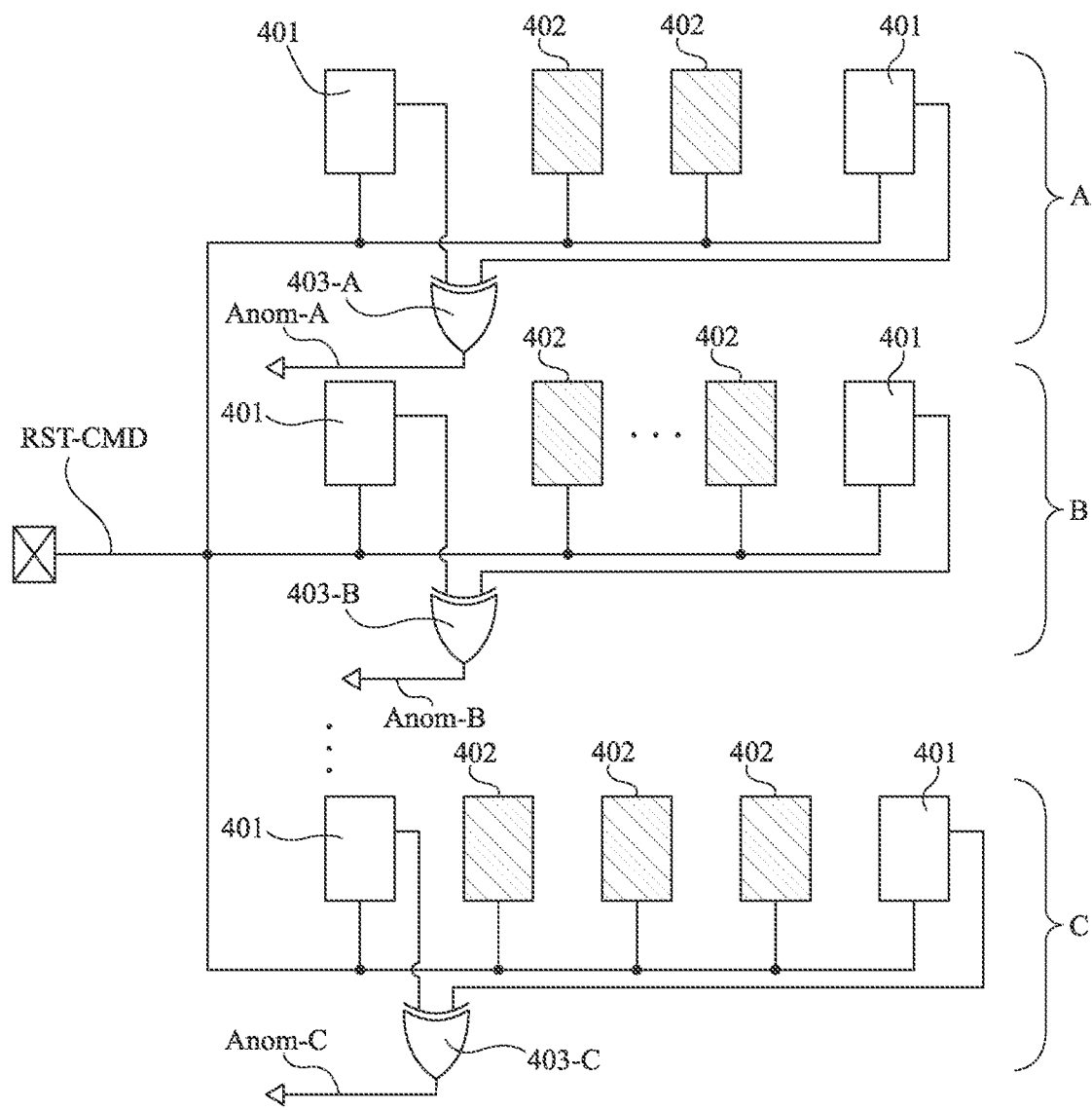
FIG. 4 schematically and partially shows in the form of blocks a variant of a portion of the embodiment of FIG. 2.

FIG. 4 schematically shows in the form of blocks an example of layout of flip-flops 401 of an anomaly detection circuit of the type of the anomaly detection circuit 300 described in relation with FIG. 3 and another example of embodiment of a parity control circuit of the type of the circuit 303 described in relation with FIG. 3. FIG. 4 further illustrates hatched flip-flops 402 forming the reset terminal of components 101-1 to 101-N.

In this example, flip-flops 402 are arranged in the form of a plurality of branches all having a common end. Each branch comprises one or a plurality of flip-flops 402. In the example of FIG. 4, flip-flops 402 are arranged in the form of three branches A, B, and C. In practice, the different branches are metal tracks coupled to the reset inputs of flip-flops 402. In practical, each branch A, B, C can correspond to a domain or to a group of components of the electronic device comprising the anomalous detection circuit.

According to an embodiment, flip-flops 401 are arranged as follows. Each branch of flip-flops 402 is associated with two flip-flops 401. A first flip-flop 401 is arranged on the side of a first end of the branch, and a second flip-flop is arranged on the side of a second end of the branch. In other words, the two flip-flops 401 are arranged on either side of the flip-flops 402 of a same branch.

Further, according to an example, the parity circuit of the anomaly detection circuit is formed of a plurality of XOR-type logic gates, each associated with a branch. In the example of FIG. 4, the parity circuit comprises three logic gates 403-A, 403-B, and 403-C, respectively associated with branches A, B, and C. Each logic gate 403-A, 403-B, and 403-C is configured to receive as an input the outputs of the flip-flops 401 of the branch A, B, or C with which the logic gate is associated. Each logic gate 403-A, 403-B, and 403-C is configured to deliver at its output an anomaly signal Anom-A, Anom-B, Anom-C capable of being sent to the control circuit of the reset circuit.

According to an alternative embodiment, anomaly signals Anom-A, Anom-B, Anom-C are combined to provide a single anomaly signal to the control circuit of the reset circuit.

Various embodiments and variants have been described. Those skilled in the art will understand that certain features of these various embodiments and variants may be combined, and other variants will occur to those skilled in the art. In particular, those skilled in the art will be capable of selecting the number of flip-flops comprised in the anomaly detection circuit according to different parameters. The higher the number of flip-flops, the more accurate the anomaly detection. The lower the number of flip-flops, the more the cost and the bulk of the anomaly detection circuit is minimized.

Finally, the practical implementation of the described embodiments and variations is within the abilities of those skilled in the art based on the functional indications given hereabove.

The invention claimed is:

1. A circuit for resetting an electronic device that comprises at least two electronic components, said circuit for resetting comprising:
   a parity control circuit;
   at least two first flip-flops, each first flip-flop comprising an output coupled to at least one of said at least two electronic components; and
   at least two second flip-flops, each second flip-flop comprising at least one output coupled to an input of said parity control circuit.

2. The circuit according to claim 1, further comprising a control circuit configured to deliver a reset control signal, wherein each flip-flop of said at least two first and second flip-flops is controlled by said reset signal.

3. The circuit according to claim 2, wherein each flip-flop of said at least two first and second flip-flops comprises at least one reset input receiving the reset control signal.

4. The circuit according to claim 1, wherein each flip-flop of said at least two second flip-flops comprises at least one input configured to receive a power supply voltage.

5. The circuit according to claim 1, wherein each flip-flop of said at least two second flip-flops is placed at a distance shorter than a critical distance from one first flip-flop of the at least two first flip-flops.

6. The circuit according to claim 5, wherein said critical distance is a minimum length of a metal track for which a pulse is recognizable as being a control pulse by said at least two first flip-flops.

7. The circuit according to claim 6, wherein said pulse is recognizable as being a control pulse when its time duration is longer than a minimum duration and/or when a value of its amplitude is greater than a minimum value.

8. The circuit according to claim 1, wherein at least one second flip-flop of said at least two second flip-flops is associated with a plurality of first flip-flops of said at least two first flip-flops.

9. The circuit according to claim 1, wherein each flip-flop of said at least two first and second flip-flops is a D-type flip-flop.

10. The electronic device, comprising said reset circuit according to claim 1.

11. A method of detecting a partial reset attack using said reset circuit according to claim 1, said method comprising:
   detecting when said at least two second flip-flops have different states; and
   then signaling with said parity control circuit an anomaly.

12. The method according to claim 11, further comprising, in response to said parity control circuit signaling the anomaly, requesting by a control circuit a resetting of said device.

13. The circuit according to claim 1, wherein the parity control circuit is configured to detect when the outputs said at least two second flip-flops have different states, and in response thereto signal an anomaly.

14. A circuit, comprising:
   a plurality of electronic components;
   wherein each electronic component has a reset input;
   a plurality of first flip-flops coupled to a reset line;
   wherein each first flip-flop has an output coupled to the reset input of a corresponding electronic component;
   a plurality of second flip-flops coupled to the reset line;
   a first logic circuit configured to logically combine signals output from the plurality of second flip-flops;
   a second logic circuit configured to logically combine a signal output from the first logic circuit and a reset signal, wherein an output signal from the second logic circuit is applied to the reset line.

15. The circuit according to claim 14, wherein each second flip-flop is placed at a distance shorter than a critical distance from one of the plurality of first flip-flops.

16. The circuit according to claim 15, wherein said critical distance is a minimum length of a metal track for which a pulse is recognizable as being a control pulse by said at least two first flip-flops.

17. The circuit according to claim 16, wherein said pulse is recognizable as being a control pulse when its time duration is longer than a minimum duration.

18. The circuit according to claim 16, wherein said pulse is recognizable as being a control pulse when a value of its amplitude is greater than a minimum value.

19. The circuit according to claim 14, further comprising a pulse stretch circuit configured to control a stretch of the signal output from the first logic circuit.

20. The circuit according to claim 14, further comprising:
   a node configured to receive the reset signal; and
   a pull down transistor connected said node and controlled in response to the signal output from the first logic circuit.

21. The circuit according to claim 20, further comprising: a buffering circuit configured to buffer the reset signal before application to the second logic circuit.

22. The circuit according to claim 14, further comprising: a spike filter configured to filter the output signal from the second logic circuit.

* * * * *